(12) United States Patent
Tetsuka

(10) Patent No.: US 8,459,143 B2
(45) Date of Patent: *Jun. 11, 2013

(54) BICYCLE BRAKE AND SHIFT OPERATING DEVICE

(75) Inventor: Toshio Tetsuka, Sakai (JP)

(73) Assignee: Shimano, Inc., Sakai (JP)

( * ) Notice: Subject to any disclaimer, the term of this patent is extended or adjusted under 35 U.S.C. 154(b) by 1192 days.

This patent is subject to a terminal disclaimer.

(21) Appl. No.: 11/771,166

(22) Filed: Jun. 29, 2007

(65) Prior Publication Data
US 2008/0168856 A1 Jul. 17, 2008

(30) Foreign Application Priority Data
Jan. 11, 2007 (JP) ................. 2007-002929

(51) Int. Cl.
- B60K 20/02 (2006.01)
- B60K 20/06 (2006.01)
- B62L 3/02 (2006.01)
- B60K 23/06 (2006.01)
- B62M 25/04 (2006.01)

(52) U.S. Cl.
CPC .............. B60K 23/06 (2013.01); B62M 25/04 (2013.01)
USPC .............................. 74/502.2; 74/488; 74/489

(58) Field of Classification Search
USPC . 74/502.2, 471 R, 488, 489; 192/217; 701/51
IPC ....................................................... B62K 23/06
See application file for complete search history.

(56) References Cited

U.S. PATENT DOCUMENTS

| 1,208,427 A | 12/1916 | White |
| 2,925,061 A * | 2/1960 | Thornburgh et al. ........ 116/28.1 |
| 3,805,733 A * | 4/1974 | Gilbert .......................... 116/28.1 |
| 4,065,983 A | 1/1978 | Mimura |
| 4,143,557 A | 3/1979 | Wakebe et al. |
| 4,900,291 A | 2/1990 | Patterson |
| 5,358,451 A | 10/1994 | Lacombe et al. |
| 5,400,675 A | 3/1995 | Nagano |
| 5,470,277 A | 11/1995 | Romano |
| 5,653,649 A | 8/1997 | Watarai |
| 5,678,455 A | 10/1997 | Watarai |

(Continued)

FOREIGN PATENT DOCUMENTS

| DE | 196 42 906 A1 * | 4/1997 |
| DE | 19644906 A1 | 4/1997 |

(Continued)

OTHER PUBLICATIONS

Translation of JPO Notification of Reasons for Refusal on Oct. 31, 2012.*

(Continued)

*Primary Examiner* — Vinh Luong
(74) *Attorney, Agent, or Firm* — James A. Deland

(57) ABSTRACT

A bicycle brake and shifting device comprises a mounting bracket structured to be mounted on a bicycle handlebar; a brake lever pivotably coupled to the brake bracket; a first shift operating member movably coupled to the brake lever; a second shift operating member movably coupled to the brake lever, wherein the second shift operating member is a separate member from the first shift operating member; a first electric switch operated by the first shift operating member; and a second electric switch operated by the second shift operating member.

19 Claims, 10 Drawing Sheets

U.S. PATENT DOCUMENTS

| | | | |
|---|---|---|---|
| 5,768,945 A | | 6/1998 | Ose |
| 5,941,125 A | | 8/1999 | Watarai et al. |
| 6,015,036 A | | 1/2000 | Fukuda |
| 6,031,190 A | | 2/2000 | Tokuda et al. |
| 6,038,923 A | | 3/2000 | Lin |
| 6,073,730 A | | 6/2000 | Abe |
| 6,161,448 A | * | 12/2000 | Wang .................... 74/502.2 |
| 6,216,078 B1 | | 4/2001 | Jinbo et al. |
| 6,227,068 B1 | | 5/2001 | Masui et al. |
| 6,467,786 B2 | | 10/2002 | Horiuchi |
| 6,546,827 B2 | | 4/2003 | Irie |
| 6,698,307 B2 | | 3/2004 | Wesling et al. |
| 6,698,567 B2 | | 3/2004 | Dal Pra |
| 6,941,834 B2 | | 9/2005 | Irie |
| 6,991,081 B2 | | 1/2006 | Uno et al. |
| 7,007,785 B2 | | 3/2006 | Uno et al. |
| 7,080,723 B2 | | 7/2006 | Uno et al. |
| 7,184,872 B2 | * | 2/2007 | Guderzo .................... 701/51 |
| 7,854,180 B2 | * | 12/2010 | Tetsuka .................... 74/473.12 |
| 2001/0012978 A1 | | 8/2001 | Jinbo et al. |
| 2001/0053724 A1 | | 12/2001 | Campagnolo |
| 2003/0019712 A1 | | 1/2003 | Dal Pra |
| 2003/0074997 A1 | | 4/2003 | Wesling et al. |
| 2007/0193387 A1 | * | 8/2007 | Nakano .................... 74/501.6 |
| 2008/0314183 A1 | * | 12/2008 | Miki .................... 74/473.13 |
| 2010/0186538 A1 | * | 7/2010 | Tetsuka .................... 74/501.6 |

FOREIGN PATENT DOCUMENTS

| | | | |
|---|---|---|---|
| EP | 0849160 A2 | | 6/1998 |
| EP | 1225123 A1 | | 7/2002 |
| EP | 1375325 A2 | | 1/2004 |
| EP | 1473220 A1 | | 11/2004 |
| EP | 1736404 A1 | | 12/2006 |
| EP | 2 210 804 A2 | * | 7/2010 |
| FR | 2654698 A1 | | 5/1991 |
| JP | 60-85297 U | | 6/1985 |
| JP | 2004-182053 | * | 7/2004 |
| JP | 2004-352227 | * | 12/2004 |
| JP | 2005-153865 | * | 6/2005 |

OTHER PUBLICATIONS

European search report for EP 07022622.0, the European application that corresponds to this application, dated Sep. 29, 2008.

* cited by examiner

BICYCLE BRAKE AND SHIFT OPERATING DEVICE

BACKGROUND OF THE INVENTION

The present invention is directed to bicycle brake and shift operating devices and, more particularly, to a bicycle brake and shift operating device that is mountable on a handlebar of a bicycle for controlling the operation of a brake device and an electrically operated bicycle transmission.

Many current bicycle shift operating devices have the ability to electrically control the shifting of a bicycle transmission through a plurality of gear ratios. A known shift operating device of this type is shown in U.S. Pat. No. 6,991,081. That shift operating device includes shift operating members and electric switches mounted to a brake bracket and to a brake lever of a brake operating device. One shift operating member is used to control the operation of an electrically operated front derailleur, and another shift operating member is used to control the operation of an electrically operated rear derailleur. The shift operating device for the rear derailleur is disposed on the right side of the handlebar, and the shift operating device for the front derailleur is disposed on the left side of the handle bar in the same manner as conventional cable-operated shift operating devices. Each shift operating device comprises a shift switch including a lever member that pivots laterally in opposite directions from a neutral starting position. Pivoting the lever member in one direction from the neutral position produces electrical signals to upshift the bicycle transmission by one gear, and pivoting the lever member in the opposite direction from the neutral position produces electrical signals to downshift the bicycle transmission by one gear.

The lever member normally is pivoted by using one or more fingers of the rider's hand while simultaneously grasping the handlebar or the brake lever mounting bracket. Pivoting the lever member laterally inwardly towards the center of the handlebar is easy because it follows the natural bending of the fingers when the hand is grasping the handlebar. However, pivoting the lever member laterally outwardly is more difficult because it requires using a dorsal part of the finger such as the fingernail and hyperextending the finger in a manner that tends to loosen the rider's grip on the handlebar.

SUMMARY OF THE INVENTION

The present invention is directed to various features of a bicycle brake and shift operating device. In one embodiment, a bicycle brake and shifting device comprises a mounting bracket structured to be mounted on a bicycle handlebar; a brake lever pivotably coupled to the brake bracket; a first shift operating member movably coupled to the brake lever; a second shift operating member movably coupled to the brake lever, wherein the second shift operating member is a separate member from the first shift operating member; a first electric switch operated by the first shift operating member; and a second electric switch operated by the second shift operating member. Additional inventive features will become apparent from the description below, and such features alone or in combination with the above features and their equivalents may form the basis of further inventions as recited in the claims.

DETAILED DESCRIPTION OF THE EMBODIMENTS

Figure 1:
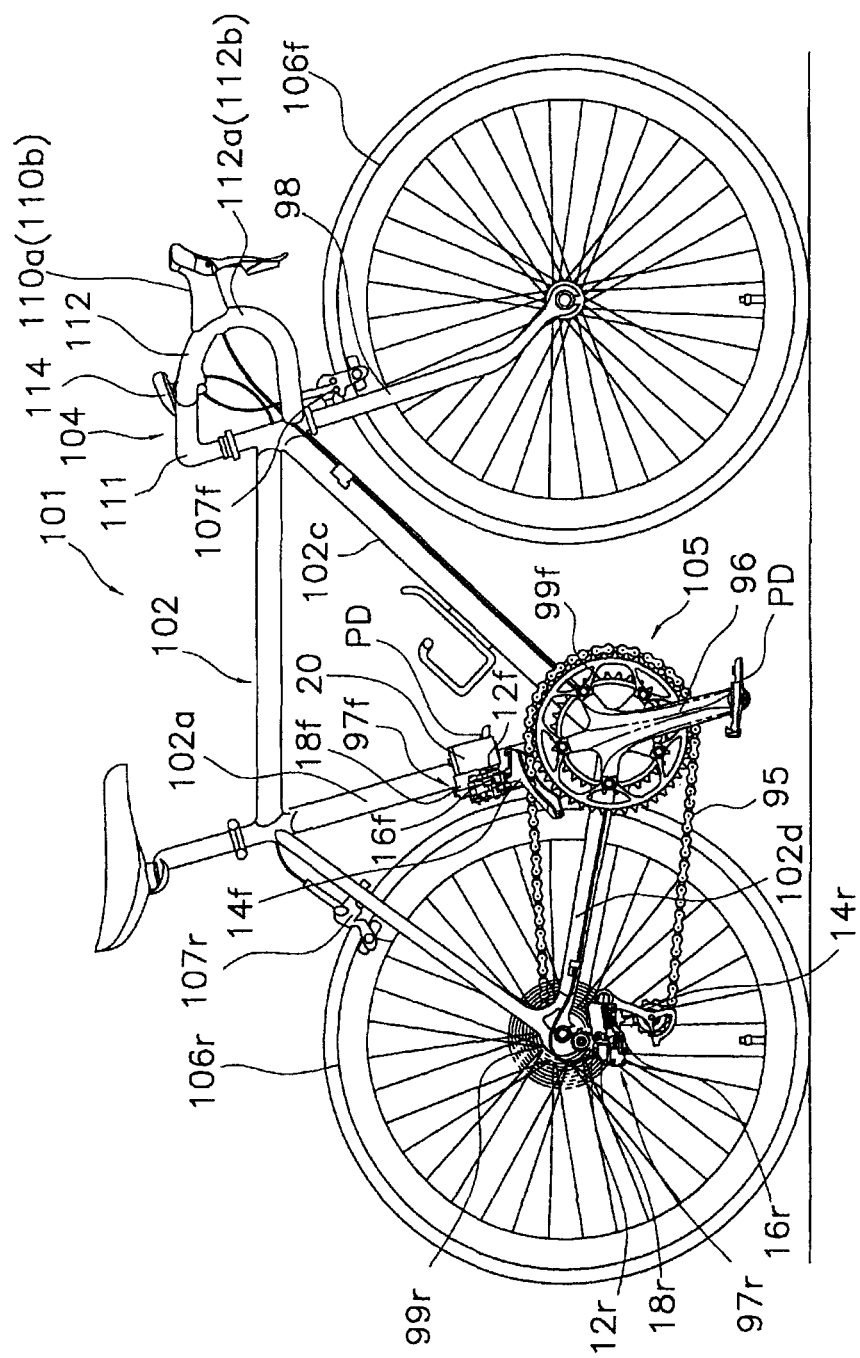
FIG. 1 is a side view of a bicycle that employs embodiments of brake and shift operating devices.

FIG. 1 is a side view of a particular embodiment of a bicycle 101. Bicycle 101 is a road bicycle comprising a diamond-shaped frame 102, a front fork 98 rotatably mounted to frame 102, a handlebar assembly 104 mounted to the upper part of fork 98, a front wheel 106f rotatably attached to the lower part of fork 98, a rear wheel 106r rotatably attached to the rear of frame 102, and a drive unit 105. A front wheel brake 107f is provided for braking front wheel 106f, and a rear wheel brake 107r is provided for braking rear wheel 106r.

Drive unit 105 comprises a chain 95, a front sprocket assembly 99f coaxially mounted with a crank 96 having pedals PD, an electrically operated front derailleur 97f attached to a seat tube 102a of frame 102, a rear sprocket assembly 99r coaxially mounted with rear wheel 106r, and an electrically operated rear derailleur 97r. In this embodiment, front sprocket assembly 99f comprises two sprockets mounted coaxially with crank 96, and rear sprocket assembly 99r comprises ten sprockets mounted coaxially with rear wheel 106r. The smallest front sprocket and the largest rear sprocket are located closest to frame 102 in a well-known manner. Front derailleur 97f moves to two operating positions to switch chain 95 between the two front sprockets, and rear derailleur 97r moves to ten operating positions to switch chain 95 among selected ones of the ten rear sprockets.

Figure 2:
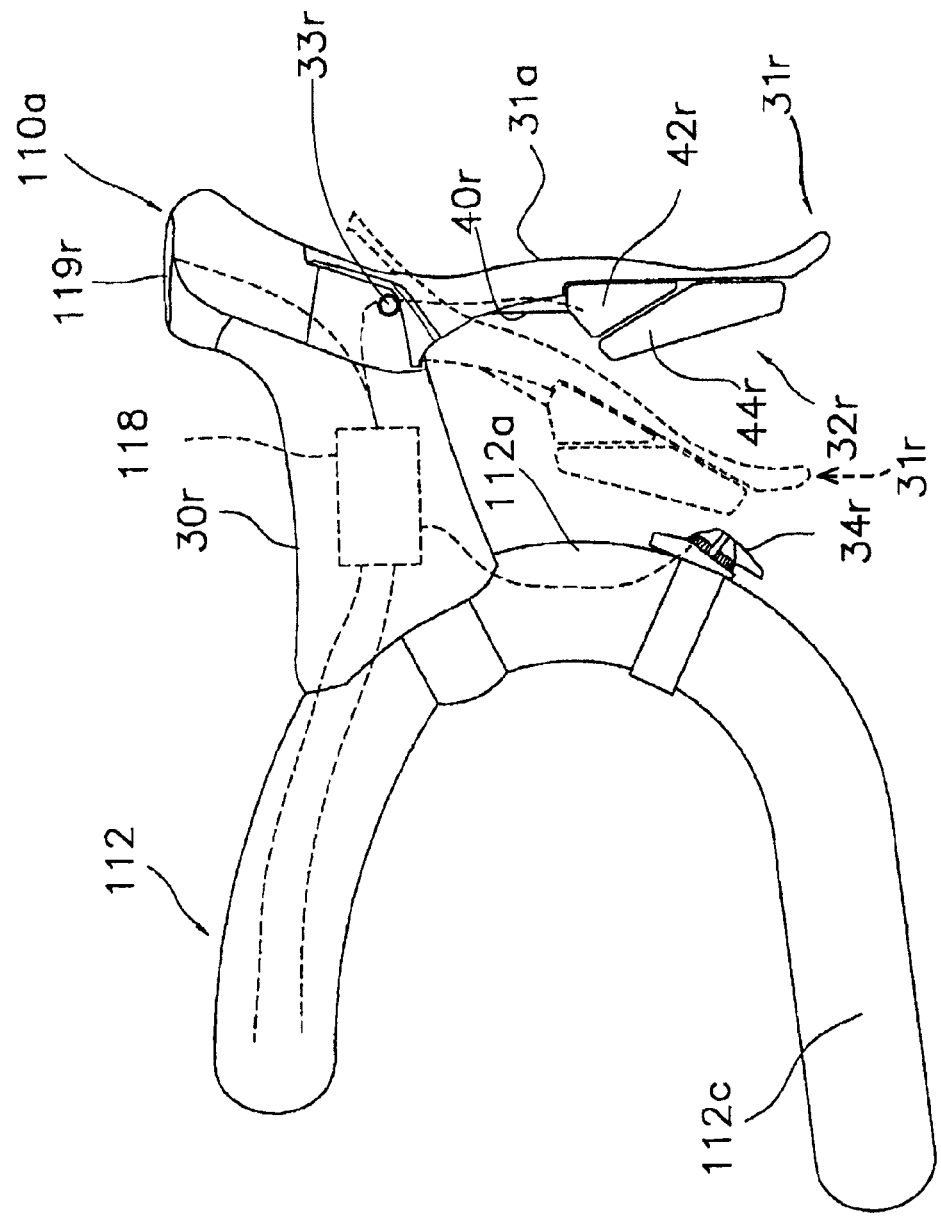
FIG. 2 is an enlarged side view of a brake and shift operating device for operating a rear brake and derailleur of the bicycle.
Figure 3:
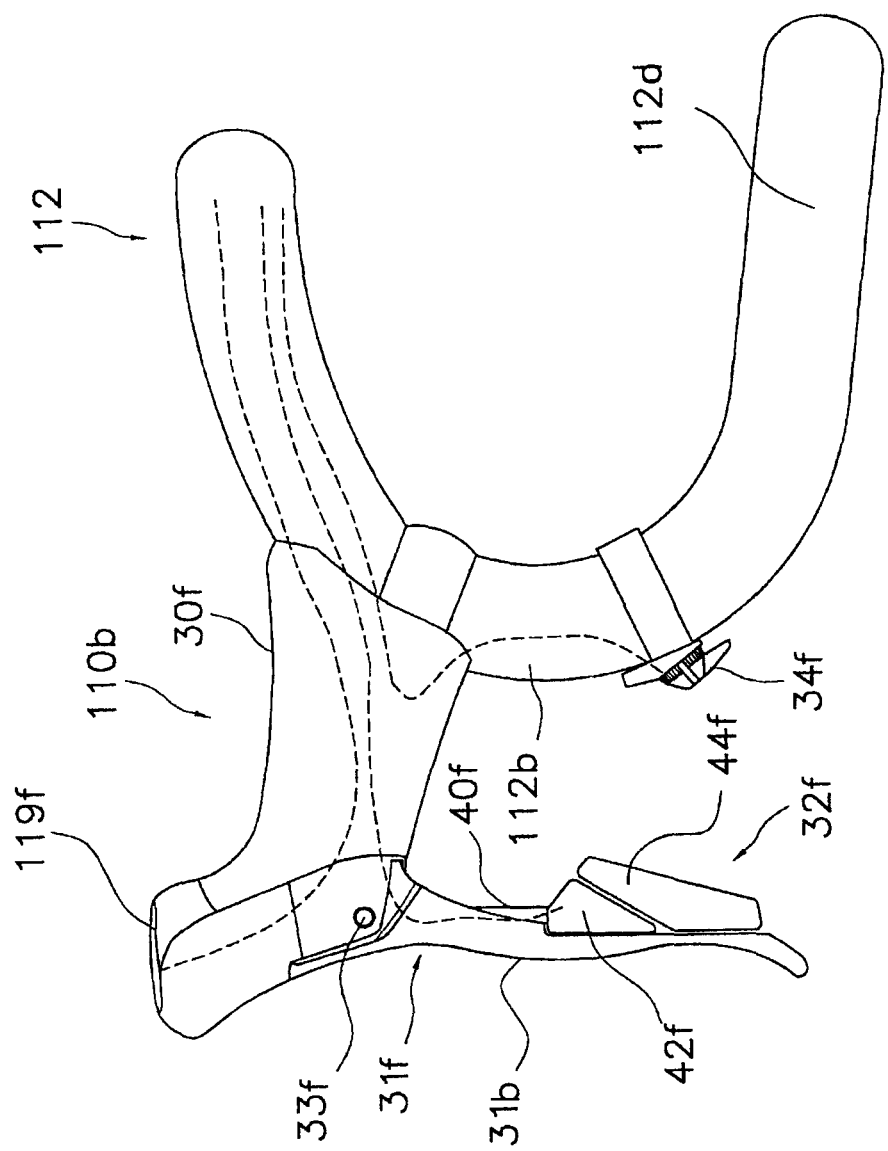
FIG. 3 is an enlarged side view of a brake and shift operating device for operating a front brake and derailleur of the bicycle.

Handlebar assembly 104 comprises a handlebar stem 111 and a drop-style handlebar 112, wherein handlebar stem 111 is mounted to the upper part of fork 98, and handlebar 112 is mounted to the forward end portion of handlebar stem 111. Handlebar 112 includes a right-side, forwardly bending U-shaped curved portion 112a and a left-side, forwardly bending U-shaped curved portion 112b. A brake and shift operating device 110a for controlling the operation of rear brake 107r and rear derailleur 97r is mounted to curved portion 112a as shown in FIG. 2, and a brake and shift operating device 110b for controlling the operation of front brake 107f and front derailleur 97f is mounted to curved portion 112b as shown in FIG. 3. As used herein, the terms up, down, front and rear refer to the orientation of an upstanding bicycle as shown in FIG. 1, wherein the front of the bicycle is the right portion of the bicycle shown in FIG. 1. The terms left and right refer to the lateral sides of the bicycle when viewed from the rear. Brake and shift operating devices 110a and 110b are coupled to rear and front brakes 107r and 107f, respectively, through respective Bowden cables in a conventional manner.

Brake and shift operating devices 110a and 110b also are coupled to rear and front derailleurs 97r and 97f, respectively, through appropriate wiring as described below. A display unit 114 is attached to a central portion of handlebar 112. Display unit 114 displays the speed of the bicycle, distance traveled, gear position, etc. in a known manner.

Figure 10:
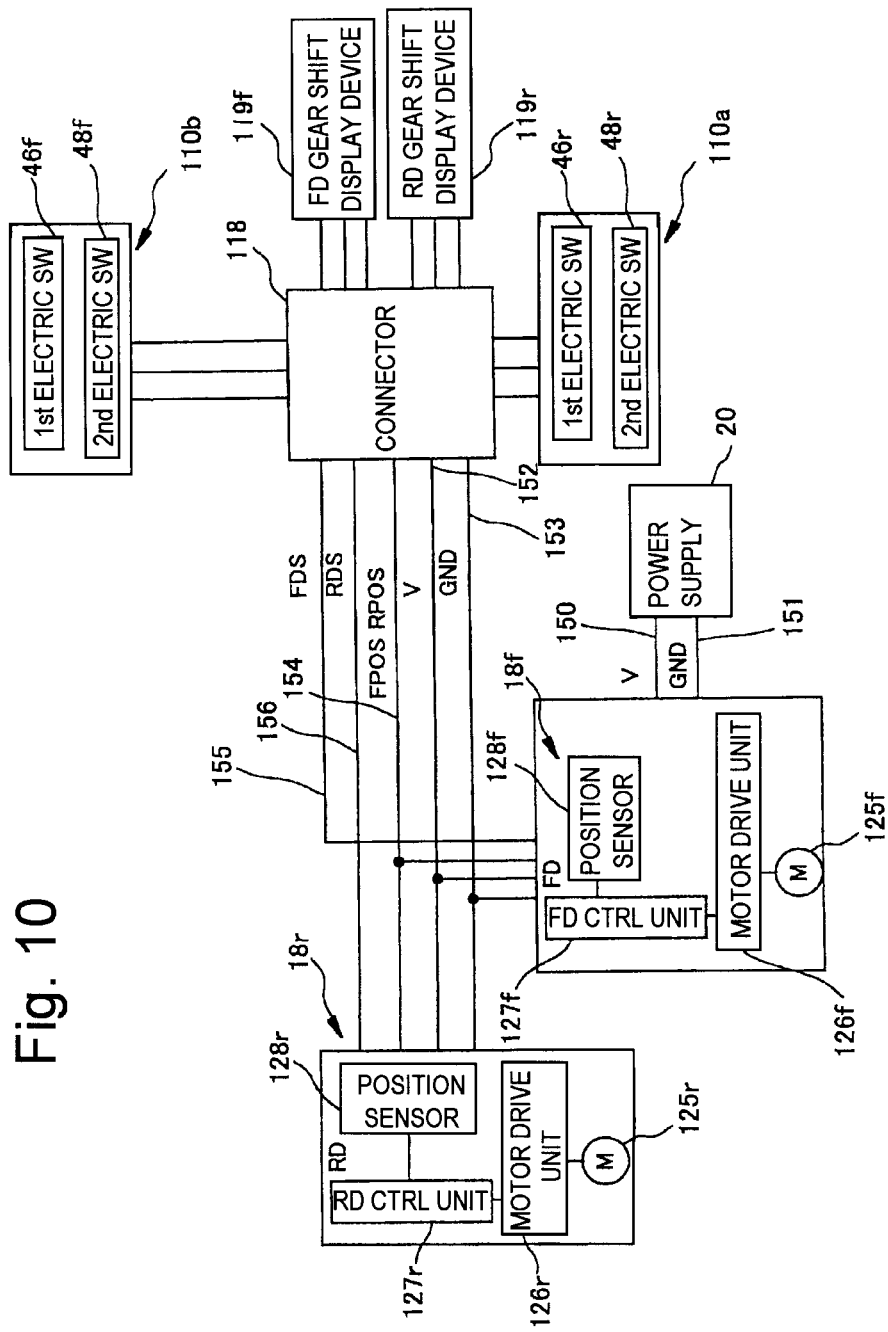
FIG. 10 is a schematic diagram of a shift control system.

Front derailleur 97f includes a mounting member 12f mounted to seat tube 102a, a chain guide 14f, a coupling unit in the form of a four-bar link mechanism 16f that couples chain guide 14f to mounting member 12f so that chain guide 14f moves relative to mounting member 12f, an electric drive unit 18f that moves chain guide 14f via link mechanism 16f, and a power supply 20 that supplies electric power to electric drive unit 18f and to other components in the system as described below. As shown in FIG. 10, electric drive unit 18f comprises a front derailleur motor 125f that may include a gear reduction unit, a front motor drive unit 126f for driving front derailleur motor 125f, a front derailleur control unit 127f that includes a programmed microprocessor and other electronic components for controlling the positioning of front derailleur 97f in response to signals received from front brake and shift operating device 110b, and a front position sensor 128f such as a rotary encoder or the like that senses the operating position of front derailleur 97f.

As shown in FIG. 1, rear derailleur 97r comprises a mounting member 12r fixed to a rear portion of a chain stay 102d of frame 102, a chain guide 14r, a coupling unit in the form of a four-bar link mechanism 16r that couples chain guide 14r to mounting member 12r so that chain guide 14r moves relative to mounting member 12r, and an electric drive unit 18r that moves chain guide 14r via link mechanism 16r. As shown in FIG. 10, electric drive unit 18r comprises a rear derailleur motor 125r that may include a gear reduction unit, a rear motor drive unit 126r for driving rear derailleur motor 125r, a rear derailleur control unit 127r that includes a programmed microprocessor and other electronic components for controlling the positioning of rear derailleur 97r in response to signals received from rear brake and shift operating device 110a, and a rear position sensor 128r such as a rotary encoder or the like that senses the operating position of rear derailleur 97r.

Figure 4:
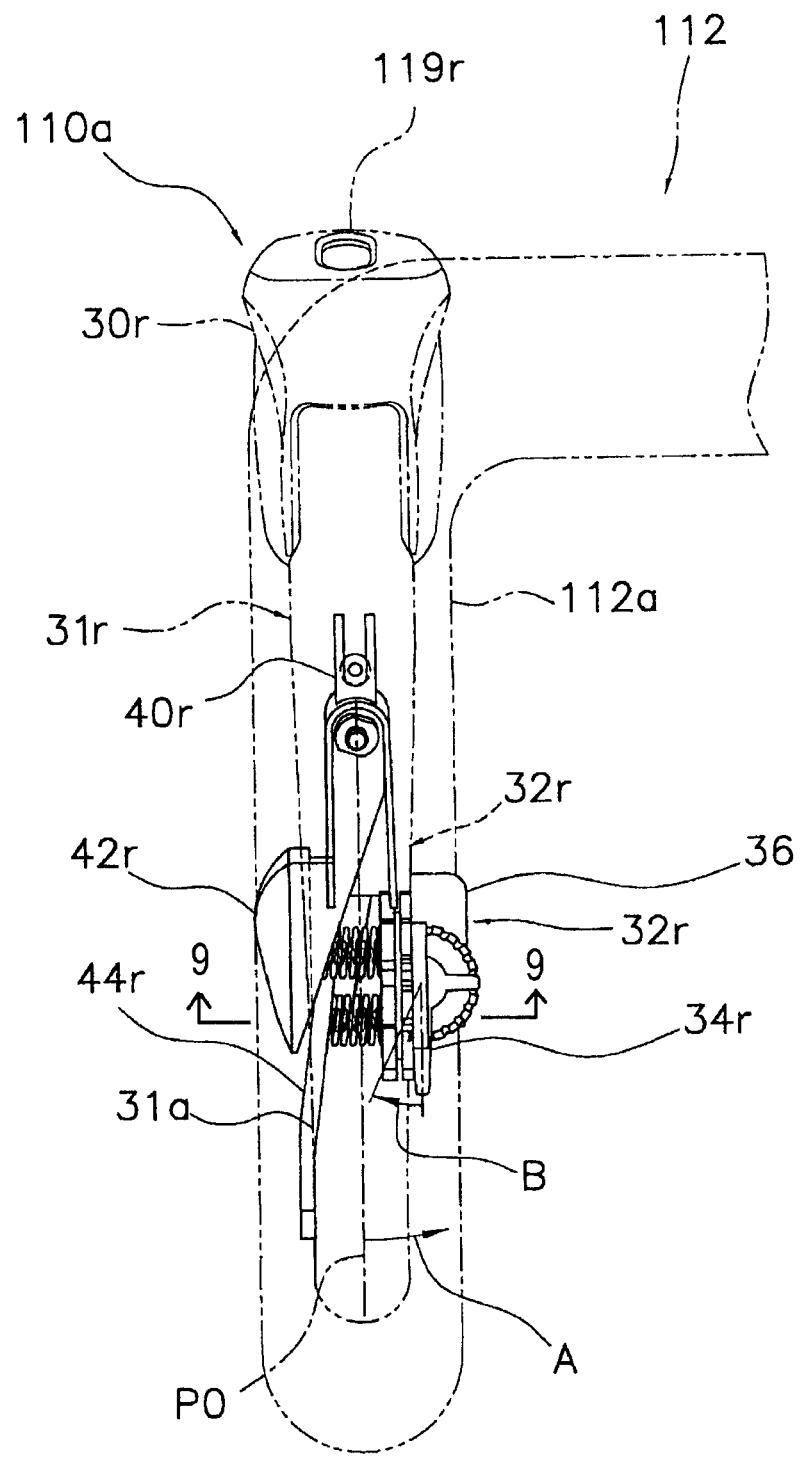
FIG. 4 is a front view of the brake and shift operating device shown in FIG. 2.
Figure 5:
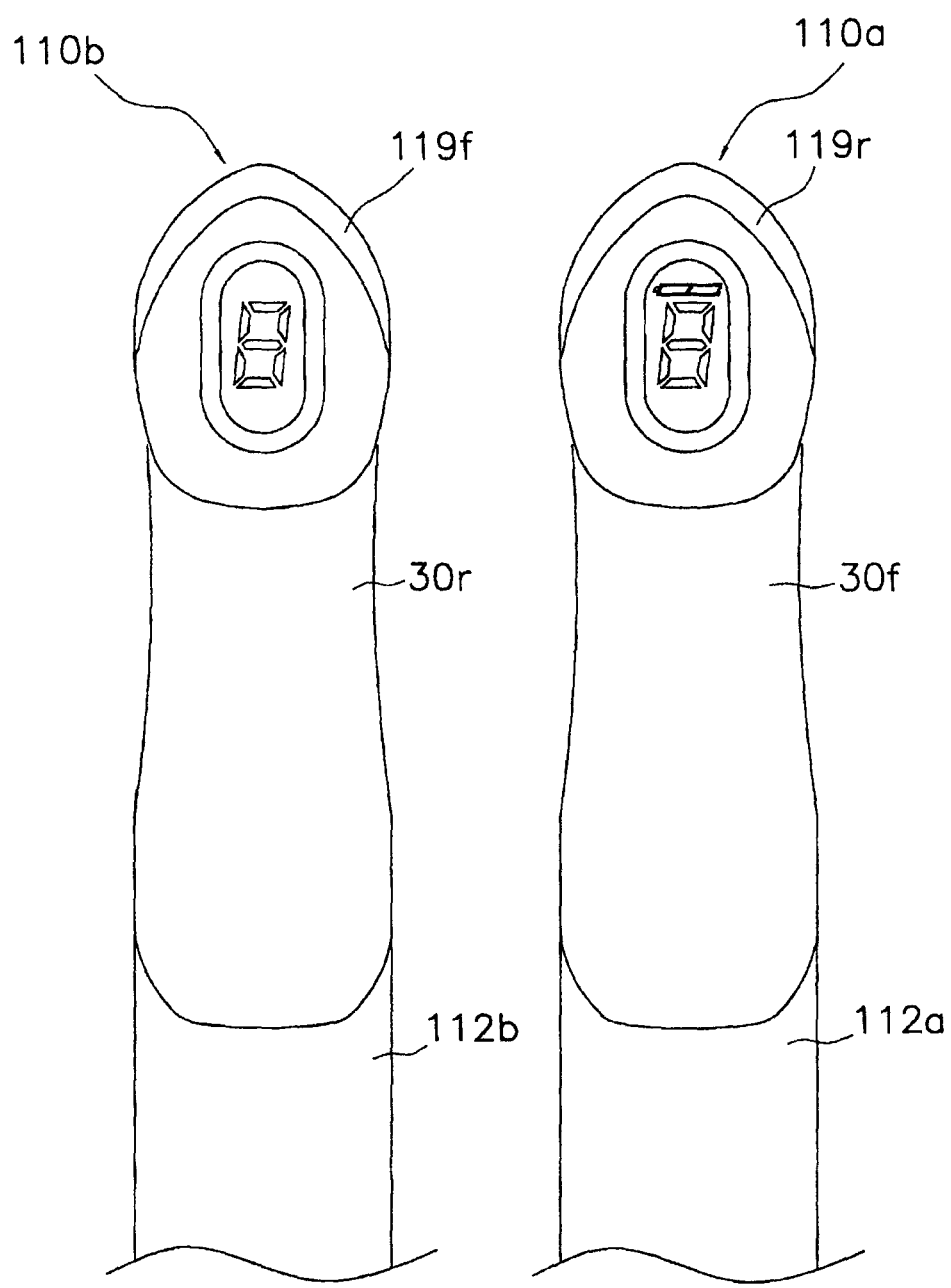
FIG. 5 is an enlarged plan view of the upper portions of the brake and shift operating devices.

Since brake and shift operating devices 110a and 110b are essentially mirror images of each other, only brake and shift operating device 110a will be described in detail. As shown in FIGS. 2, 4 and 5, brake and shift operating device 110a comprises a brake bracket 30r mounted to handlebar 112, a brake lever 31r pivotally mounted to a lower portion of brake bracket 30r through a pivot shaft 33r, and a rear shift operating unit 32r mounted on brake lever 31r. As shown in FIG. 2, brake lever 31r pivots around pivot shaft 33r to move from a non-operating rest position, shown in solid lines, to a brake operating position shown in dashed lines. A connector 118 for connecting wiring in a manner discussed below is provided inside brake bracket 30r. A rear gear shift display device 119r that displays the current gear position of rear derailleur 97r is provided at an upper front portion of brake bracket 30r. Brake lever 31r is coupled to one end of a Bowden cable (not shown) in a conventional manner. The other end of the Bowden cable is coupled to rear brake device 107r in a conventional manner. Brake lever 31r includes a lever operating portion 31a that extends downwardly from the portion of brake lever 31r supported by lever shaft 33r. Rear shift operating unit 32r is mounted to a rear surface of lever operating portion 31a.

A rear shift operating unit 34r used exclusively for upshifting rear derailleur 97r is mounted on a lower portion of curved portion 112a of handlebar 112. Rear shift operating unit 34r enables easy upshifting when the rider grips an end portion 112c of handle bar 112 instead of curved portion 112a (e.g., during sprinting). Rear shift operating unit 34r comprises a lever-type switch unit that pivots outward relative to handlebar 112 as shown by arrow B in FIG. 4, thereby making it easy to operate the lever with the thumb.

As shown in FIGS. 2, 4 and 6-8, rear shift operating unit 32r comprises a mounting member 40r mounted to the rear surface of lever operating portion 31a, first shift operating member 42r movably coupled to brake lever 31r through mounting member 40r, a separate second shift operating member 44r movably coupled to brake lever 31r through mounting member 40r, a first electric switch 46r (FIGS. 7 and 10) operated by first shift operating member 42r, and a second electric switch 48r operated by second shift operating member 44r. First and second shift operating members 42r and 44r are disposed in close proximity to brake lever 31r behind brake lever 31r so that first shift operating member 42r and second shift operating member 44r are ahead of brake lever 31r in the direction of movement of brake lever 31r when brake lever 31r moves from the non-operating rest position towards the brake operating position.

In this embodiment, mounting member 40r is fixed to the rear surface of lever operating portion 31a so that the position of mounting member 40r may be adjusted in the longitudinal (vertical) direction of lever operating portion 31a. Mounting member 40r comprises a fixing portion 50 that includes a U-shaped groove 50a for adjustably mounting the mounting member 40r onto lever operating portion 31a, a pivot coupling portion 52 integrally formed with fixing portion 50 for coupling first and second shift operating members 42r and 44r for pivoting around a common axis, and a switch mounting unit 54 disposed at the lower end of mounting member 40. First and second electric switches 46r and 48r are mounted to switch mounting unit 54.

Mounting member 40r is fixed to lever operating portion 31a by a fixing screw 56 that extends through U-shaped groove 50a on fixing portion 50 and screws into the rear surface of lever operating portion 31a. A pivot shaft 58 in the form of a bolt extends through pivot coupling portion 52. The upper end portions of first and second shift operating members 42r and 44r are supported by and pivot around pivot shaft 58. Pivot shaft 58 comprises a head portion 58a disposed at the rear end of pivot shaft 58, a screw portion 58b disposed at the front of pivot shaft 58, and a shaft portion 58c disposed between head portion 58a and screw portion 58b. Shaft portion 58c has a diameter that is larger than screw portion 58b. Pivot shaft 58 is fixed to mounting member 40r by a nut 59 disposed on the front surface of mounting member 40r. Pivot coupling portion 52 comprises a bottom portion 52a and a generally U-shaped control wall portion 52b. Control wall portion 52b controls the pivoting ranges of first and second shift operating members 42r and 44r.

First shift operating member 42r is a generally plate-shaped member used for upshifting rear derailleur 97r. As shown in FIG. 4, first shift operating member 42r pivots from an operation starting (home) position P0 inwardly towards the center of the handlebar 112 as indicated by arrow A. First shift operating member 42r comprises an upper first supported portion 60 with a first support hole 60a through which pivot shaft 58 passes, a first arm portion 61 extending radially downwardly from first supported portion 60, and a first operating portion 62 that bends approximately 90 degrees from the bottom of first arm portion 61. A plastic member 63 having a first operating surface 63a that extends three-dimensionally (for example) is integrally formed on an exterior surface of first operating portion 62.

Second shift operating member 44r is a generally plate-shaped member used for downshifting rear derailleur 97r.

Second shift operating member 44r also pivots from an operation starting (home) position inwardly towards the center of handlebar 112 as indicated by arrow A in FIG. 4. Second shift operating member 44r comprises an upper second supported portion 65 with a second support hole 65a through which pivot shaft 58 passes, a second arm portion 66 extending radially downwardly from second supported portion 65, and a second operating portion 67 that bends approximately 90 degrees from the bottom of second arm portion 66. Second arm portion 66 bends backwards and then downwards in the midsection thereof. Second operating portion 67 is obliquely disposed with a tip thereof slightly bent to be disposed parallel to and aligned with first operating portion 62. A generally plane-shaped second operating surface 67a is formed on the exterior surface of second operating portion 67. In this embodiment, second operating portion 67 is disposed at a position that is further away from pivot shaft 58 than first operating portion 62. More specifically, second operating portion 67 is disposed at a different radial position from first operating portion 62 relative to pivot shaft 58. Furthermore, when both first and second shift operating members 42r and 44r are at their respective home positions, first operating surface 63a and second operating surface 67a are disposed on different planes. Also, the operating area of first operating surface 63a differs from the operating area of second operating surface 67a, with the area of second operating surface 67a being greater than that of first operating surface 63a. This enables the rider to identify first shift operating member 42r and second shift operating member 44r merely by touching the members, thereby helping to prevent erroneous operations.

Figure 6:
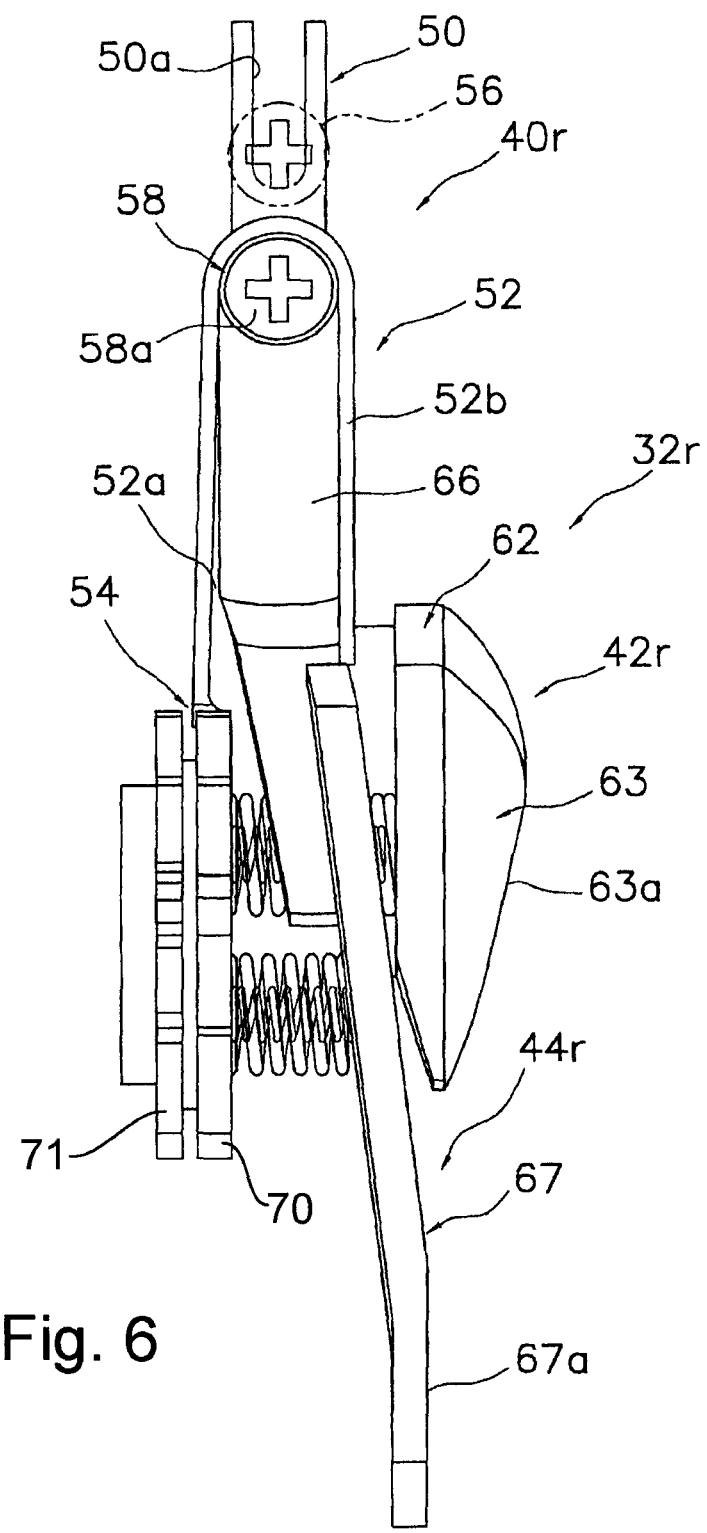
FIG. 6 is a rear view of the brake and shift operating device shown in FIG. 2.
Figure 7:
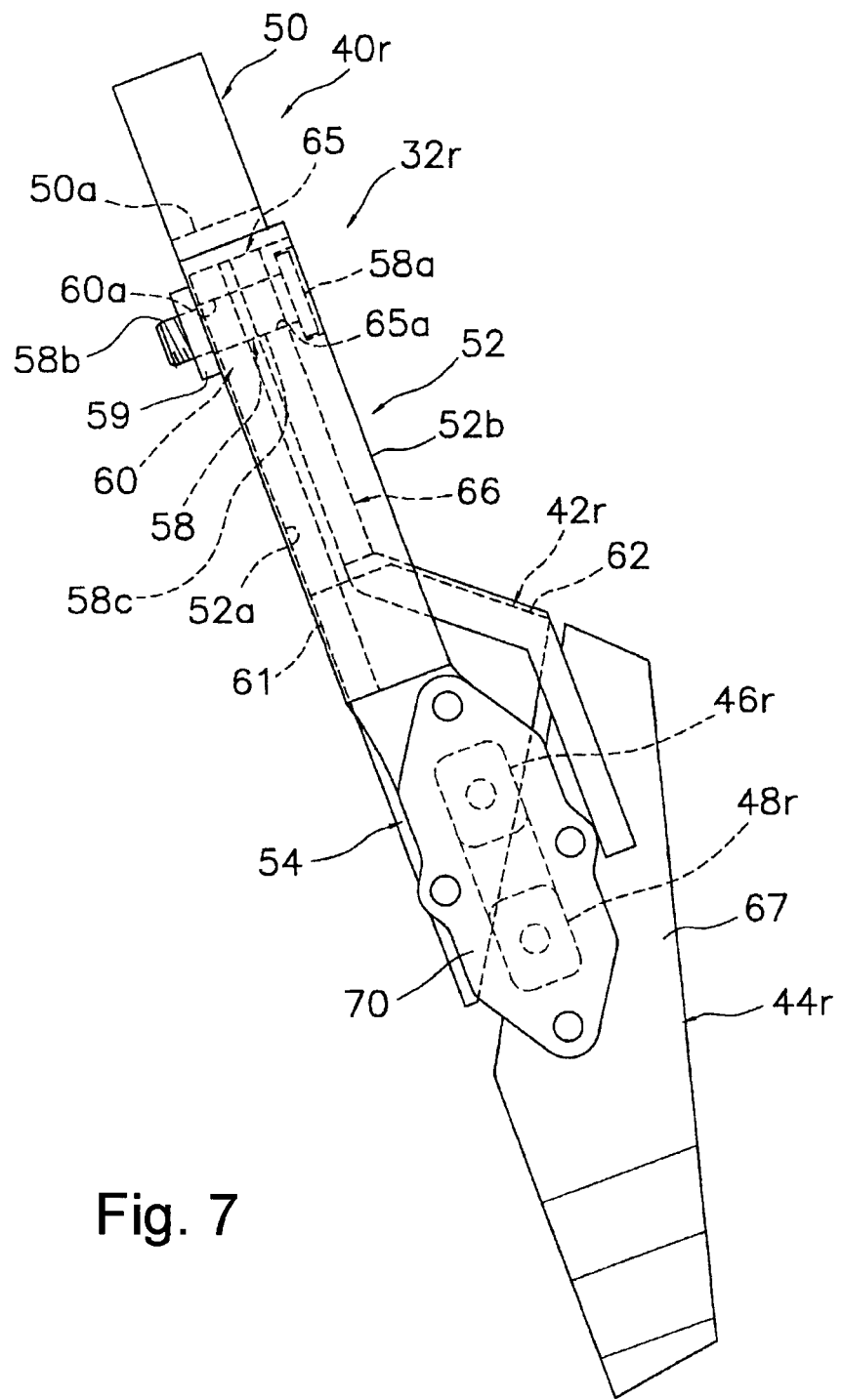
FIG. 7 is a left side view of the brake and shift operating device shown in FIG. 2.
Figure 8:
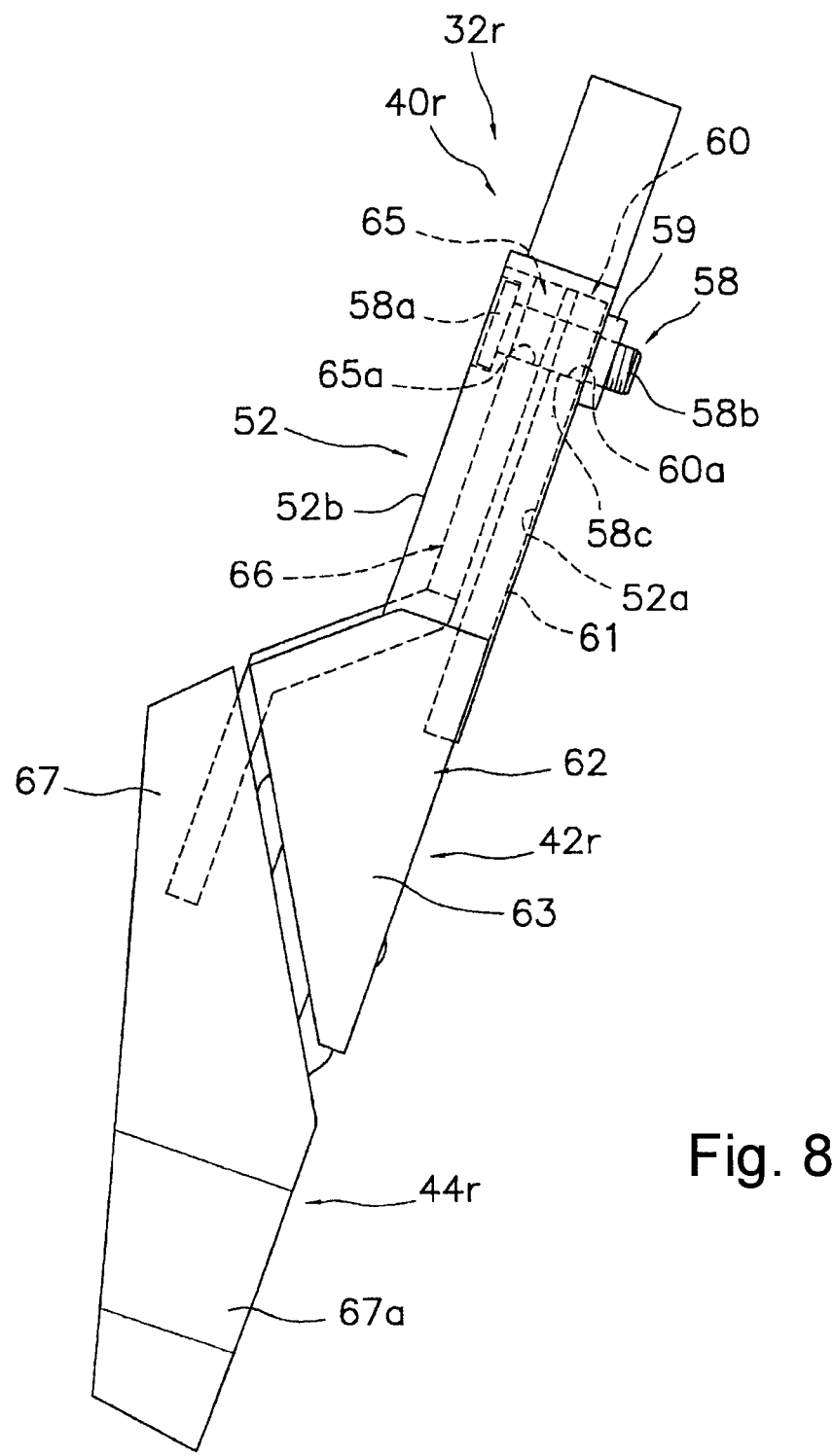
FIG. 8 is a right side view of the brake and shift operating device shown in FIG. 2.
Figure 9:
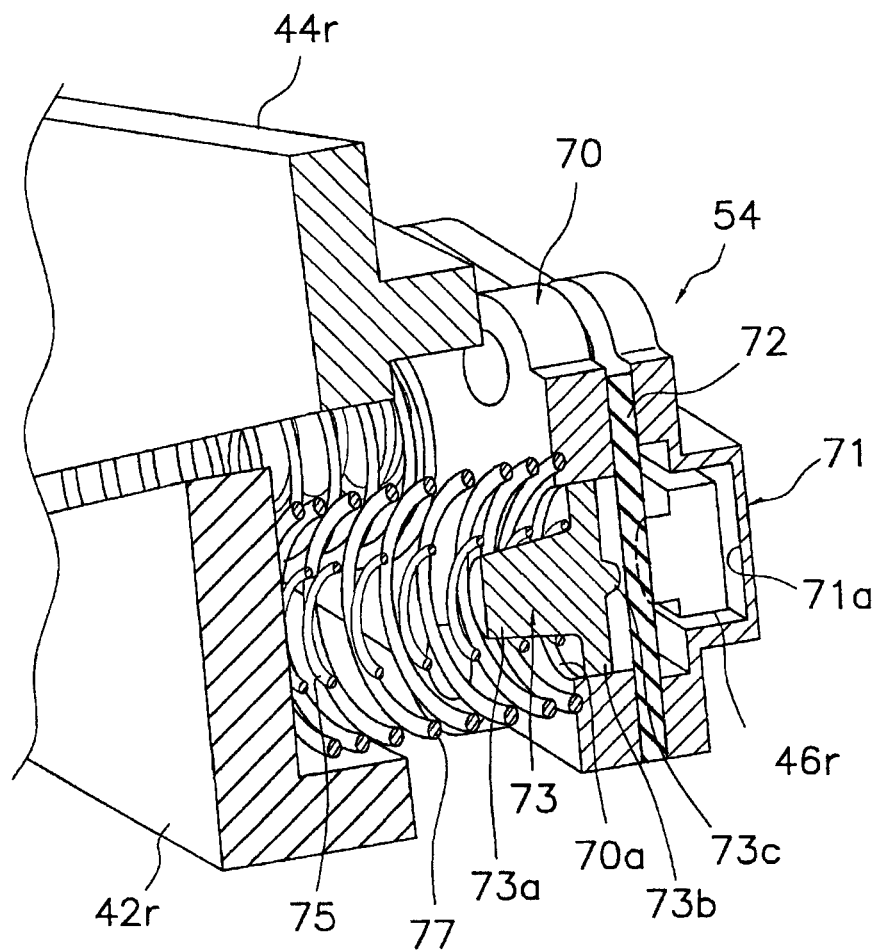
FIG. 9 is a perspective cross-sectional view of a switch unit taken along line 9-9 in FIG. 4.

As shown in FIGS. 6, 7 and 9, switch mounting unit 54 is disposed at a position opposite first and second operating portions 62 and 67 of first and second shift operating members 42r and 44r. Switch mounting unit 54 comprises an elongated generally hexagonal switch bracket 70 integrally formed with bottom portion 52a of pivot coupling portion 52, a switch housing portion 71 having generally the same shape as switch bracket 70, and a resilient gasket 72 for waterproofing and sealing. A pair of switch stems 73 (only one switch stem 73 is shown in FIG. 9) are movably disposed in guide holes 70a formed in switch bracket 70. Gasket 72 is sandwiched between switch stems 73 and switch housing portion 71. Switch housing portion 71 may be attached to switch bracket 70 by a screw, for example. A recess 71a is formed in switch housing portion 71 for accommodating first and second electric switches 46r and 48r.

Switch stems 73 are used to separately operate first and second electric switches 46r and 48r. Each switch stem 73 comprises a cylinder portion 73a, a large-diameter flange portion 73b integrally formed on one end of cylinder portion 73a, and a switch pressing portion 73c which protrudes from the center of flange portion 73b towards gasket 72. A resilient operating member in the form of a compressed coil spring 75 is disposed around each cylinder portion 73a between flange portion 73b and its corresponding first shift operating member 42r or second shift operating member 44r. Additionally, a biasing member in the form of a coil spring 77 is disposed coaxially around each coil spring 75 between switch bracket 70 and the corresponding first shift operating member 42r or second shift operating member 44r for biasing the first switch operating member 42r or second switch operating member 44r to their respective home positions.

Pressing first shift operating member 42r towards first electric switch 46r causes spring 75 to press against flange portion 73b of switch stem 73 and move switch pressing portion 73c. Switch pressing portion 73c then deflects resilient gasket 72 to press against first electric switch 46r, thereby operating first electric switch 46r to upshift rear derailleur 97r by one speed stage. Since first shift operating member 42r does not directly contact switch stem 73, first shift operating member 42r may continue moving to further compress springs 75 and 77. This provides a very comfortable tactile sensation without a sudden stop when first electric switch 46r is activated. Spring 77 causes first shift operating member 42r to return to its home position after the rider removes his or her finger from first shift operating member 42r. Second shift operating member 44r operates in the same manner.

If desired, spring 77 for first shift operating member 42r may have a stronger spring force than spring 77 for second shift operating member 44r so that the rider may have an additional means for differentiating between the two shift operating members. Since both first shift operating member 42r and second shift operating member 44r move laterally inwardly, both upshifting and downshifting of rear derailleur 97r may be performed very comfortably.

As noted above, brake and shift operating device 110b has a configuration that is essentially a mirror image of brake and shift operating device 110a. As shown in FIGS. 3 and 5, brake and shift operating device 110b comprises a brake bracket 30f, a brake lever 31f pivotably connected to brake bracket 30f through a pivot shaft 33f for operating front brake device 107f, and a front shift operating unit 32f for operating front derailleur 97f.

As with rear shift operating unit 32r, front shift operating unit 32f comprises a mounting member 40f mounted to a rear surface of a lever operating portion 31b of brake lever 31f, a first shift operating member 42f movably coupled to brake lever 31r through mounting member 40f, a separate second shift operating member 44f movably coupled to brake lever 31f through mounting member 40f, a first electric switch 46f (FIG. 10) operated by first shift operating member 42f, and a second electric switch 48f (FIG. 10) operated by second shift operating member 44f. Since both first shift operating member 42f and second shift operating member 44f move laterally inwardly, both upshifting and downshifting of front derailleur 97f may be performed very comfortably. Additionally, a front shift operating unit 34f having a structure similar to rear shift operating unit 34r and used exclusively for upshifting front derailleur 97f is mounted at a lower portion of curved portion 112b of handlebar 112. Front shift operating unit 34f is provided to enable easy upshifting of front derailleur 97f when the rider grips an end portion 112d of handle bar 112 during riding.

As shown in FIG. 10, brake and shift operating device 110a and shift operating unit 34r are connected by electric wiring through connector 118 to electric drive unit 18r of rear derailleur 97r, and brake and shift operating device 110b and shift operating unit 34f are connected by electric wiring through connector 118 to electric drive unit 18f of front derailleur 97f. Power supply 20 mounted to front derailleur 97f provides a direct-current power supply voltage V of approximately 6 to 8.4 volts to electric drive unit 18f through a power wire 150 and a ground wire 151. The power supply voltage V also is communicated from electric drive unit 18f to electric drive unit 18r through a power wire 152 and a ground wire 153. Power wire 152 and ground wire 153 are connected to connector 118 to provide operating power to brake and shift operating devices 110a and 110b and to front and rear gear shift display devices 119f and 119r.

Gear shift position signals FPOS and RPOS from front and rear position sensors 128f and 128r are communicated via a position signal line 154 and connector 118 to front and rear gear shift display devices 119f and 119r. The currently selected gears of front and rear derailleurs 97f and 97r are displayed on front and rear gear shift display devices 119f and 119r, respectively. Shift signals FDS and RDS generated by the operation of brake and shift operating devices 110a and 110b are communicated to electric drive units 18f and 18r of front and rear derailleurs 97f and 97r through respective shift signal wires 155 and 156 via connector 118. As actually implemented in this embodiment, shift signal wire 156 carrying shift signal RDS is connected to electric drive unit 18r through electric drive unit 18f. More specifically, electric drive unit 18f is connected to connector 118 by a 5-core wire that runs along a down tube 102c of frame 102, and electric drive unit 18r is connected to electric drive unit 18f by a 4-core wire that runs along chain stay 102d. Separate connectors may be provided on electric drive unit 18f so that the wiring to electric drive unit 18r and connector 118 may be detached easily from electric drive unit 18f.

While the above is a description of various embodiments of inventive features, further modifications may be employed without departing from the spirit and scope of the present invention. For example, while the disclosed brake and shift operating devices were used to operate derailleurs, the teachings herein also may be applied to a brake and shift operating device that controls the operation of an electrically controlled internal gear shifting device. While first and second shift operating members 42r and 44r were coupled to brake lever 31r for rotation around a common axis defined by pivot shaft 58, first and second shift operating members 42r and 44r may be coupled to brake lever 31r for rotation around different axes. Also, first and second shift operating members 42r and 44r may be coupled to brake lever 31r for other types of movement such as sliding instead of pivoting. While first and second shift operating members 42r and 44r were mounted to brake lever 31r through mounting member 40r, first and second shift operating members 42r and 44r may be directly mounted to brake lever 31r. While first and second shift operating members 42r and 44r were disposed at the rear portion of brake lever 31r, the shift operating members may be disposed in many different locations, such as on the side or on a lower portion of the brake lever.

While a single operation of first and second electrical switches 46r and 48r produced a single change in speed stage, a single operation of first and second electrical switches 46r and 48r may cause shifting through a plurality of speed stages. Such an operation could be accomplished by special operations such as pressing-and-holding or double-clicking, for example. While first and second electric switches 46r and 48r were turned on and off by springs 75 to improve the tactile sensation of the operation, the electric switches may be directly operated by the shift operating members.

The size, shape, location or orientation of the various components may be changed as desired. Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Terms of degree such as "substantially," "about" and "approximately" as used herein include a reasonable amount of deviation of the modified term such that the end result is not significantly changed. For example, such terms may include a deviation of at least ±5% of the modified term as long as such a deviation would not negate the meaning of the word it modifies. Thus, the scope of the invention should not be limited by the specific structures disclosed or the apparent initial focus or emphasis on a particular structure or feature.

What is claimed is:

1. A bicycle brake and shifting device comprising:
    a brake mounting bracket structured to be mounted on a bicycle handlebar;
    a brake lever pivotably coupled to the brake mounting bracket;
    a first shift operating member coupled to the brake lever for movement relative to the brake lever;
    a second shift operating member coupled to the brake lever for movement relative to the brake lever, wherein the second shift operating member is a separate member from the first shift operating member so that the second shift operating member moves without moving the first shift operating member;
    wherein the first and second shift operating members are carried by the brake lever so that the first and second shift operating members move as a unit with the brake lever when the brake lever is operated while the brake mounting bracket is stationary;
    wherein the first shift operating member and the second shift operating member are disposed behind the brake lever so that the first shift operating member and the second shift operating member are positioned ahead of the brake lever in the direction of movement of the brake lever when the brake lever moves from a non-operating rest position towards a brake operating position;
    wherein the first shift operating member includes a first operating surface disposed in a first plane when the first shift operating member is located in a first home position, wherein the second shift operating member includes a second operating surface disposed in a second plane when the second shift operating member is disposed in a second home position, and wherein the first plane does not intersect the second plane;
    a first electric switch operated by the first shift operating member; and
    a second electric switch operated by the second shift operating member.

2. The device according to claim 1 wherein the first electric switch is mounted to the brake lever.

3. The device according to claim 2 wherein the second electric switch is mounted to the brake lever.

4. The device according to claim 1 wherein the first operating surface is located at a different longitudinal position along the brake lever relative to the second operating surface.

5. The device according to claim 1 wherein the first operating surface is pressed by the user to operate the first shift operating member, wherein the second operating surface is pressed by the user to operate the second shift operating member, and wherein the first operating surface has a different area than the second operating surface.

6. The device according to claim 1 wherein the first electric switch provides signals solely for an upshift operation, and wherein the second electric switch provides signals solely for a downshift operation.

7. The device according to claim 1 wherein the first shift operating member is pivotably coupled to the brake lever.

8. The device according to claim 7 wherein the second shift operating member is pivotably coupled to the brake lever.

9. The device according to claim 8 wherein both the first shift operating member and the second shift operating member pivot around a common axis.

10. The device according to claim 9 wherein the first operating surface is located at a different radial position relative to the second operating surface.

11. The device according to claim 1 further comprising a mounting member coupled to the brake lever, wherein the first electric switch is mounted to the brake lever through the mounting member.

12. The device according to claim 11 wherein the second electric switch is mounted to the brake lever through the same mounting member as the first electric switch.

13. The device according to claim 11 wherein the mounting member is structured to be adjusted relative to the brake lever.

14. The device according to claim 13 wherein the mounting member is structured to be adjusted longitudinally relative to the brake lever.

15. The device according to claim 1 further comprising:
a first resilient member that provides a first resisting force to the first shift operating member when the first shift operating member moves to operate the first electric switch; and
a second resilient member that provides a second resisting force to the second shift operating member when the second shift operating member moves to operate the second electric switch;
wherein the first resisting force is different from the second resisting force.

16. The device according to claim 15 wherein the first resilient member comprises a first spring.

17. The device according to claim 16 wherein the second resilient member comprises a second spring.

18. The device according to claim 1 wherein the first shift operating member and the second shift operating member are mounted to a rear surface of the brake lever.

19. The device according to claim 18 wherein brake lever is pivotably coupled to the brake mounting bracket through a lever shaft, wherein the brake lever includes a lever operating portion that extends downwardly from the lever shaft, and wherein the first shift operating member and the second shift operating member are mounted to a rear surface of the lever operating portion.

* * * * *